United States Patent
Siedelhofer et al.

(10) Patent No.: US 10,033,880 B2
(45) Date of Patent: Jul. 24, 2018

(54) GEO-REDUNDANT PCRF MRA WITH MPE ALLOCATION VIA IMSI HASHING AND IP INDEXED TABLE

(71) Applicant: Cellco Partnership, Arlington, VA (US)

(72) Inventors: Paul H. Siedelhofer, Robbinsville, NJ (US); Robert M. Ephraim, Bridgewater, NJ (US); Ho Yin Cheuk, Bridgewater, NJ (US)

(73) Assignee: Cellco Partnership, Basking Ridge, NJ (US)

(*) Notice: Subject to any disclaimer, the term of this patent is extended or adjusted under 35 U.S.C. 154(b) by 30 days.

(21) Appl. No.: 15/202,918

(22) Filed: Jul. 6, 2016

(65) Prior Publication Data

US 2016/0316069 A1 Oct. 27, 2016

Related U.S. Application Data

(63) Continuation of application No. 14/261,866, filed on Apr. 25, 2014, now Pat. No. 9,397,891.

(51) Int. Cl.
| | |
|---|---|
| *H04M 15/00* | (2006.01) |
| *H04L 29/06* | (2006.01) |
| *H04L 12/24* | (2006.01) |
| *H04L 29/08* | (2006.01) |
| *H04W 4/24* | (2018.01) |

(52) U.S. Cl.
CPC ........ *H04M 15/66* (2013.01); *H04L 41/0893* (2013.01); *H04L 65/1016* (2013.01); *H04L 65/80* (2013.01); *H04L 67/00* (2013.01); *H04L 67/141* (2013.01); *H04M 15/57* (2013.01); *H04M 15/8044* (2013.01); *H04W 4/24* (2013.01)

(58) Field of Classification Search
CPC . H04W 12/14; H04W 12/1403; H04W 12/66; H04L 4/24
See application file for complete search history.

(56) References Cited

U.S. PATENT DOCUMENTS

| | | | |
|---|---|---|---|
| 9,019,890 B2* | 4/2015 | Rui | H04L 12/14 370/328 |
| 9,036,554 B2 | 5/2015 | Merino Vazquez | |
| 9,668,161 B2* | 5/2017 | Kavunder | H04W 28/0215 |
| 2015/0106454 A1* | 4/2015 | Lim | H04W 8/02 709/206 |

* cited by examiner

*Primary Examiner* — Chandrahas B Patel

(57) ABSTRACT

A system includes a wireless access network, a gateway that controls communications between the wireless access network and a packet data network, and a policy-charging-and-rule-function (PCRF). The PCRF includes a routing agent in communication with the gateway and a group of multimedia processing engines (MPEs) that are associated with the routing agent. The routing agent receives from the gateway a request to establish a session for a piece of user equipment, and selects one of the MPEs to handle the session based on an IMSI of the piece of user equipment. The routing agent maintains a table indexed by IP address, and makes an entry therein that points to the selected MPE.

17 Claims, 7 Drawing Sheets

Figure 6A

Site 1

| MRA 1-A | MRA 1-B | MRA 2-C | MPE 1-A-8 |
|---|---|---|---|
| MPE 1-A-1 | MPE 1-B-1 | MPE 2-C-1 | MPE 1-A-9 |
| MPE 1-A-2 | MPE 1-B-2 | MPE 2-C-2 | MPE 1-B-8 |
| MPE 1-A-3 | MPE 1-B-3 | MPE 2-C-3 | MPE 1-B-9 |
| MPE 1-A-4 | MPE 1-B-4 | MPE 2-C-4 | MPE 2-C-8 |
| MPE 1-A-5 | MPE 1-B-5 | MPE 2-C-5 | MPE 2-C-9 |
| MPE 1-A-6 | MPE 1-B-6 | MPE 2-C-6 | -empty- |
| MPE 1-A-7 | MPE 1-B-7 | MPE 2-C-7 | -empty- |

Site 2

| MRA 2-A | MRA 2-B | MRA 1-C | MPE 2-A-8 |
|---|---|---|---|
| MPE 2-A-1 | MPE 2-B-1 | MPE 1-C-1 | MPE 2-A-9 |
| MPE 2-A-2 | MPE 2-B-2 | MPE 1-C-2 | MPE 2-B-8 |
| MPE 2-A-3 | MPE 2-B-3 | MPE 1-C-3 | MPE 2-B-9 |
| MPE 2-A-4 | MPE 2-B-4 | MPE 1-C-4 | MPE 1-C-8 |
| MPE 2-A-5 | MPE 2-B-5 | MPE 1-C-5 | MPE 1-C-9 |
| MPE 2-A-6 | MPE 2-B-6 | MPE 1-C-6 | -empty- |
| MPE 2-A-7 | MPE 2-B-7 | MPE 1-C-7 | -empty- |

Figure 6B

Site 1

| MRA 1-A | MRA 1-B | MPE 2-C-1 | MPE 1-A-8 |
|---|---|---|---|
| MPE 1-A-1 | MPE 1-B-1 | MPE 2-C-2 | MPE 1-A-9 |
| MPE 1-A-2 | MPE 1-B-2 | MPE 2-C-3 | MPE 1-A-10 |
| MPE 1-A-3 | MPE 1-B-3 | MPE 2-C-4 | MPE 1-B-8 |
| MPE 1-A-4 | MPE 1-B-4 | MPE 2-C-5 | MPE 1-B-9 |
| MPE 1-A-5 | MPE 1-B-5 | MPE 2-C-6 | MPE 1-B-10 |
| MPE 1-A-6 | MPE 1-B-6 | MPE 2-C-7 | MPE 2-C-9 |
| MPE 1-A-7 | MPE 1-B-7 | MPE 2-C-8 | MPE 2-C-10 |

Site 2

| MRA 2-A | MRA 2-B | MPE 1-C-1 | MPE 2-A-8 |
|---|---|---|---|
| MPE 2-A-1 | MPE 2-B-1 | MPE 1-C-2 | MPE 2-A-9 |
| MPE 2-A-2 | MPE 2-B-2 | MPE 1-C-3 | MPE 2-A-10 |
| MPE 2-A-3 | MPE 2-B-3 | MPE 1-C-4 | MPE 2-B-8 |
| MPE 2-A-4 | MPE 2-B-4 | MPE 1-C-5 | MPE 2-B-9 |
| MPE 2-A-5 | MPE 2-B-5 | MPE 1-C-6 | MPE 2-B-10 |
| MPE 2-A-6 | MPE 2-B-6 | MPE 1-C-7 | MPE 1-C-9 |
| MPE 2-A-7 | MPE 2-B-7 | MPE 1-C-8 | MPE 1-C-10 |

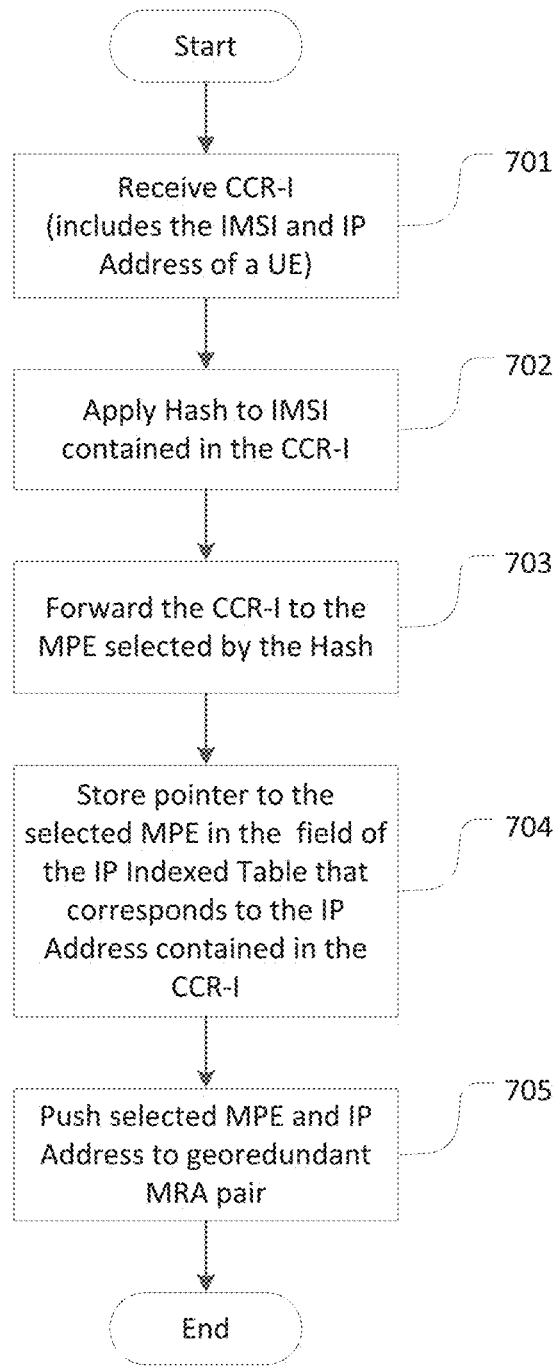

GEO-REDUNDANT PCRF MRA WITH MPE ALLOCATION VIA IMSI HASHING AND IP INDEXED TABLE

CROSS REFERENCE TO RELATED APPLICATIONS

This application is a continuation of, and claims priority from, U.S. patent application Ser. No. 14/261,866, filed on Apr. 25, 2014, now U.S. Pat. No. 9,397,891, issued Jul. 19, 2016, the contents of which are hereby incorporated by reference in its entirety.

BACKGROUND

Wireless networks, such as long term evolution (LTE) networks, generally include a Policy Charging and Rule Function (PCRF), which is responsible for policy-making and control decisions. The PCRF may dynamically determine policy rules for data flows on the network, such as, for example, Quality of Service (QoS) and billing parameters for the flows. These rules may be communicated to a gateway, such as a Packet Data Network Gateway (PGW), which may enforce the rules on the data flows. For example, if a piece of user equipment (UE) is attempting to establish a connection to a particular Packet Data Network (PDN)— suppose for a voice-over-LTE (VoLTE) call—then the PCRF may generate rules for the QoS for the connection and pass those rules on to the PGW for enforcement. The PCRF may create one or more sessions for each of the UEs connected to the network in order to manage data flows in real time.

The PCRF may include numerous Multi-Media Processing Engines (MPEs), which create and manage the sessions. When a request for a new session is received by the PCRF, the MPE that will handle the session may be selected by a Multi-Protocol Routing Agent (MRA) included in the PCRF. The MRA may distribute the PCRF session load across the multiple MPEs, and may route messages received from the gateway or other sources (such as, for example, an IP Multimedia Subsystem (IMS)) to the appropriate MPE. Once a session is established, the MRA may continue to receive messages corresponding to the session and route the messages to the appropriate MPE handling the session.

In selecting MPEs to handle sessions and in routing the various messages to the appropriate MPEs, the MRA may generate various messages and perform various processing operations. Moreover, when the PCRF is in a geo-redundant configuration, the number of these messages and processing operations may increase. These messages and processing operations may create a substantial processing load for the MRA and other network components.

BRIEF DESCRIPTION OF THE DRAWINGS

FIG. 6A illustrates an exemplary geo-redundant PCRF Segment without IP Indexed Tables.
FIG. 6B illustrates an exemplary geo-redundant PCRF Segment with IP Indexed Tables.
FIG. 7 illustrates an exemplary process of selecting an MPE and syncing IP Indexed Tables.

DETAILED DESCRIPTION

An Multi-Protocol Routing Agent (MRA) of a Policy Charging and Rule Function (PCRF) according to various exemplary approaches of the present disclosure may select the Multi-Media Processing Engine (MPE) on which to establish a new session by employing an International Mobile Subscriber Identity (IMSI) Hash. The IMSI Hash may be a heuristic that assigns IMSI values to the MPEs of the PCRF, such that when a given piece of user equipment (UE) requests establishment of a new session, the IMSI of the given UE determines the MPE upon which the new session will be established. This is in contrast to, for example, a Round-Robin method of selecting MPEs, in which MPE selection is done one-at-a-time in a predetermined repeating order and does not depend upon the IMSI of the UE. Moreover, according to various illustrations of the present disclosure, an IP Indexed Table is maintained by the MRA for keeping track of MPE sessions. This is in contrast to, for example, using a Session Biding Repository (SBR), which is a database storing information for each established session, including a session ID number, the International Mobile Subscriber Identity (IMSI) of the UE, an IP address assigned to the UE, and the MPE handling the session. Unlike the SBR, the IP Indexed Table is indexed by IP Address. In addition, the IP Indexed Table may omit various types of data entries that would be required in the SBR. Further, according to various illustrations of the present disclosure, a geo-redundant PCRF configuration may be employed, and the IP Indexed Tables of the MRAs in geo-redundant paired PCRFs may be synced. At least some of the advantages of various illustrations of the present disclosure include reducing the amount of signaling between MRAs in a Geo-redundant configuration and reducing the amount of processing required by MRAs.

Fourth Generation (4G) wireless networks, for example Long Term Evolution (LTE) wireless networks (occasionally referred to as Evolved Packet System (EPS) wireless networks) as defined by the 3rd Generation Partnership Project (3GPP) standardization, are used herein to facilitate explanation of the systems, apparatuses, methods, etc. disclosed herein. Nevertheless, the disclosed examples are intended to be illustrative, not limiting, and the systems, apparatuses, methods, etc. disclosed herein may be applied to other types of packet-switched and/or wireless networks.

Figure 1:
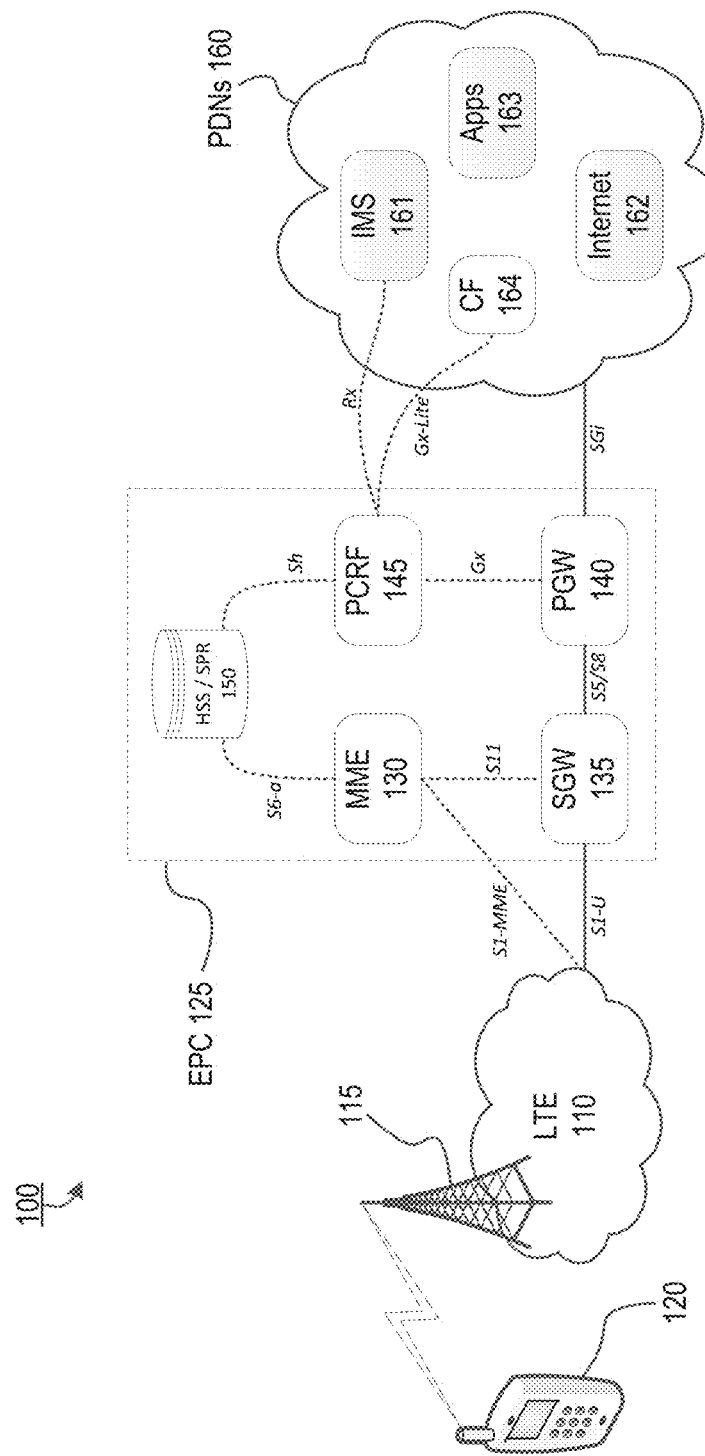
FIG. 1 illustrates an exemplary wireless network.

FIG. 1 illustrates a wireless network 100 implementing an LTE/EPS architecture. The wireless network 100 may be conceptually divided into a Radio Access Network (RAN) portion and a core network portion. The RAN includes an LTE network 110 (occasionally referred to as an E-UTRAN) having one or more eNode B nodes (eNB nodes) 115. The core network includes an Evolved Packet Core (EPC) 125. A portion of the LTE standard specifies the inclusion of a flat IP-based network architecture designed to replace the general packet radio service (GPRS) core network often used for 2G and 3G cellular communication systems. Accordingly, the EPC 125 may be an IP network and may be substantially packet-switched. Services such as voice which are traditionally circuit-switched, may accordingly be provided as packet-switched communications over the EPC 125.

The one or more eNB nodes 115 of the LTE 110 may be in communication with the EPC 125 and with one or more wireless devices 120. The eNB nodes 115 combine the functionality of both base station and radio access controllers (RNC) of 2G or 3G radio access networks. The eNB nodes 115 may accordingly support the LTE 110 air interface and may include functions for radio resource control, user plane ciphering and packet data convergence protocol (PDCP). A wireless device 120 may include any device or devices configured to wirelessly communicate with an RAN—in the case of a 4G-LTE network, with the eNB nodes 115—and to be operated by one or more users, such as a cellular telephone, laptop computer, tablet computing device, or personal digital assistant, among other exemplary devices. In addition to network functionality, wireless device 120 may include one or more components capable of receiving input such as voice and data entry from a user, and providing output to the user such as audible and/or visual output. In the LTE standardization, the wireless devices 120 are referred to as "User Equipment (UE)," and for convenience this convention will be followed herein.

The EPC 125 may include a Mobility Management Entity (MME) 130, a Serving Gateway (SGW) 135, a Packet Data Network (PDN) gateway (PGW) 140, a PCRF 145, and a home subscriber server (HSS) 160. While shown logically within the EPC 125, the physical locations of each component may be remote from one another. The EPC may be in communication with various Packet Data Networks (PDNs) 160, including, for example, an IP Multimedia Subsystem (IMS) 161 PDN, an Internet 162 PDN, an Applications 163 PDN, and a content filtering (CF) 164 PDN, etc.

The MME 130 may be configured to perform control-plane functionality and to manage mobility information, UE 120 identities, and security and authentication parameters. The SGW 135 may be configured to operate as a gateway between the EPC 125 and the LTE 110. The PGW 140 may be configured to operate as the gateway between the EPC 125 and the PDNs 160. The SGW 135 and PGW 140 may be configured to perform bearer-plane functionality. The PCRF 145 performs control-plane functionality and is responsible for policy-making and charging control decisions. The PCRF 145 will be discussed in greater detail below. The HSS 150 may be one or more databases configured to store user information and user profiles. In the network 100 of FIG. 1, the Subscriber Profile Repository (SPR) (discussed further below) is shown as part of the HSS 150, but this need not necessarily be the case. Control-plane functionality includes protocols and communications paths used to configure the network to meet wireless device demand for data services, such as the establishment of connections, the control of attributes, the routing or re-routing of established connections, and the assignment and reassignment of resources to UE 120. Examples of control-plane interfaces include the S1-MME interface between the LTE 110 and the MME 130, the S11 interface between the SGW 135 and the MME 130, the S6-a interface between the MME 130 and the HSS/SPR 150, the Sh or Sp interface between the HSS/SPR 150 and the PCRF 145, the Gx interface between the PCRF 145 and the PGW 140, the Gx-Lite interface between the PCRF 145 and the CF 164, and the Rx interface between the PCRF 145 and the IMS 161. Bearer-place functionality includes protocols and communications paths configured to transmit the requested data services, such as to transmit Voice over Internet Protocol (VoIP) and/or video session data. Examples of bearer-plane interfaces include the S1-U interface between the LTE 110 and the SGW 135, the S5/S8 interfaces between the SGW and the PGW 140, and the SGi interfaces between the PGW 140 and the PDNs 160.

The PDNs 160 provide various packet-data services to the UEs 120. For example, the IMS 161 may be configured to provide multimedia services to the UE 120, the Internet 162 may connect the UEs 120 to a packet-switched computer network such as the Internet, the Apps 163 may provide various application services to the UEs 120 such as an account information and billing applications, and the CF 164 may connect the UEs 120 to selected portions of a packet-switched computer network such as the Internet and prevent connection to other portions of the network according to an adjustable content-filtering setting. The IMS 161 and the CF 164 will be discussed in greater detail below.

Potential services provided by the IMS 161 include, for example, Short Message Service (SMS) messages (commonly referred to as "text messages" or "texts"), VoLTE, picture and video sharing, Push-to-Talk over Cellular (PoC), Voice over IP (VoIP), streaming video, interactive gaming, Instant Messaging (IM) services, etc. The IMS 161 by itself does not necessarily provide all these applications, but may provide a framework of application servers, subscriber databases, and gateways to make them possible. The exact services provided by the IMS 161 will depend on the specific configurations adopted by operators of the wireless network 100. While other protocols are possible, the session initiation protocol (SIP) has been accepted as a 3GPP signaling protocol for use by the IMS 161 for IP-based streaming multimedia services wireless networks.

The IMS 161 may include a call session control function (CSCF) (not illustrated). The CSCF is may be a central node in the IMS 161, and may be implemented as a SIP server configured to processes SIP signaling in the IMS 161, including signaling over the Rx interface with the PCRF 145. Various types of CSCFs can be included in the IMS, including Proxy CSCF 165 (P-CSCF) (not illustrated), Serving CSCF 165 (S-CSCF) (not illustrated), and Interrogating CSCF 165 (I-CSCF) (not illustrated). The P-CSCF may be a first point of contact between an IMS-based user terminal and the IMS 161 network. The P-CSCF may be configured to function as an outbound/inbound SIP proxy server, where the requests initiated by the user terminals will traverse to the P-CSCF. The S-CSCF may be configured to operate as the central node of the signaling plane. Accordingly, the S-CSCF may be a SIP server, but may also perform session control. The I-CSCF may be another SIP proxy located at the edge of an administrative domain. An IP address of the I-CSCF may be published in a domain name system (DNS) record, such that remote servers may be able to locate the I-CSCF via DNS and use the I-CSCF as a forwarding point for SIP packets to the domain of the I-CSCF. In addition to SIP proxy functionality, the I-CSCF may further be configured to have an interface to the HSS 150 to retrieve user information and routes the SIP request to the appropriate destination (e.g., S-CSCF). In addition to the CSCF, the IMS 161 may contain various application servers (AS) that may facilitate the provisioning of the aforementioned services.

The CF 164 performs a content filtering process, which allows a UE 120 to access certain content, e.g. websites, and does not allow the UE 120 to access other content. For example, a user of a UE 120 (e.g., a parent) can set an access level to prevent another user on the same account (e.g., a child) from accessing certain content. For example, when the requested content is a website, deep packet inspection (DPI) may be used to evaluate the website's uniform resource locator (URL), and if there is a match to a prohibited website, the site is blocked.

The network 100 may take many different forms and include multiple and/or alternate components and facilities.

While an exemplary network 100 is shown in FIG. 1, the exemplary components illustrated in the Figure are not intended to be limiting. Indeed, additional or alternative components and/or implementations may be used. Moreover, only some interfaces between components are illustrated for simplicity, and additional or alternative connections between components are possible.

Figure 2:
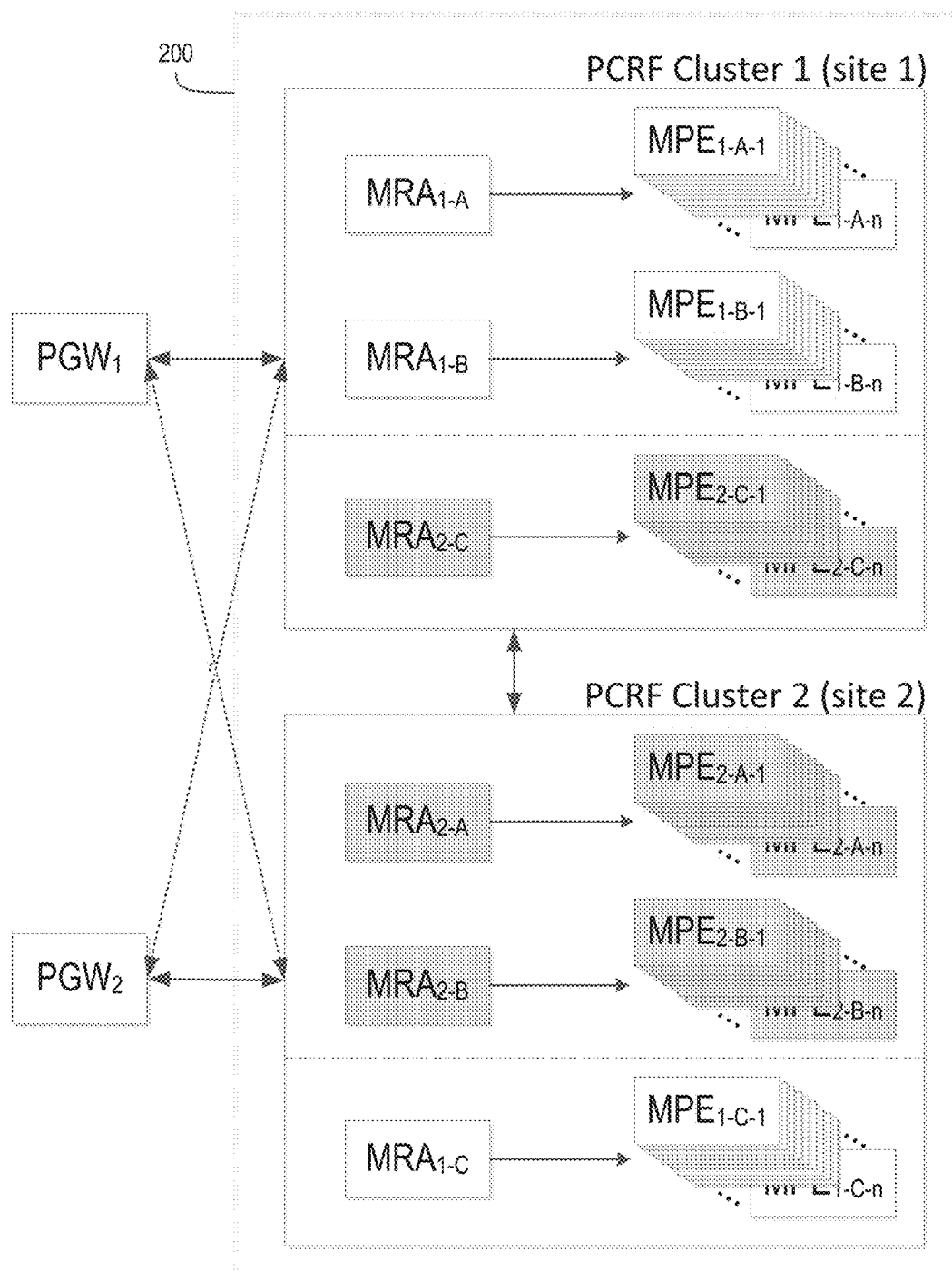
FIG. 2 illustrates an exemplary geo-redundant PCRF Segment.

FIG. 2 illustrates a pair of PCRFs 145 in a geo-redundant configuration. The PCRFs 145 may also be referred to as PCRF "Clusters" since they may include multiple MRAs and MPEs for redundancy, as discussed further below. Redundancy includes providing backup systems that are designed to come into use to continue the provision of services if their counterparts fail. In order to provide such redundancy, each component of a PCRF 145 may have a local counterpart provided in standby mode as a redundant backup. Thus, in FIG. 2 the active $MRA_{1-A}$ of the PCRF Cluster 1 is provided with a standby $MRA_{1-B}$ as a local backup (i.e., in the same geographical location—site 1 in the Figure), and each active $MPE_{1-A-i}$ of the PCRF Cluster 1 is provided with a corresponding standby $MPE_{1-B-i}$ as a local backup. Similarly, the active $MRA_{2-A}$ of the PCRF Cluster 2 is provided with a standby $MRA_{2-B}$ as a local backup, and each active $MPE_{2-A-i}$ of the PCRF Cluster 2 is provided with a corresponding standby $MPE_{2-B-i}$ as a local backup. These local backups can ensure continued service if their individual counterpart components fail.

However, certain events may be of such a nature that all components within a geographical vicinity of the event fail (e.g., natural disasters, widespread electrical power loss, etc.). In order to guard against such failure, geographical redundancy (geo-redundancy) may be provided in addition to local redundancy. Geo-redundancy may entail providing backup systems at a geographical location that is remote from their counterparts. Thus, a geo-redundant configuration of PCRFs 145 may include at least two PCRFs 145 located at different geographical locations. For purposes of this application, being located in different geographical locations means at least being located in different buildings. In certain illustrations, even greater distance between the active component and the geo-redundant backup may be desired. It will be understood that the locations of the paired geo-redundant PCRFs 145 may be selected so as to minimize the chance that both are simultaneously affected by the same component-failure-causing event. Thus, in certain illustrations the pair of PCRFs 145 in a geo-redundant configuration are located in different cities, different counties, different states, different time zones, or even potentially even further apart. Moreover, the locations of the paired PCRFs 145 may be based on any factors relevant to reducing the risk of simultaneous site failure, such as environmental considerations and the like (for example, the PCRFs 145 may be located so as to be in different flood, seismic, or weather risk zones).

A PCRF Segment is at least two PCRFs 145 paired in a geo-redundant configuration. One example of such a geo-redundant configuration is illustrated in FIG. 2. In FIG. 2 a PCRF Segment 200 is illustrated comprising PCRF Cluster 1 and PCRF Cluster 2, which are located a geographically different locations (sites 1 and 2, respectively). A specific group of PGWs are allocated to each PCRF Segment 200 in the network 100 (note that although FIG. 1 illustrates only one PGW 140, one PCRF 145, and so on, this is merely for ease of illustration—multiple ones of each component may be included as needed to scale the system). For example, in FIG. 2, $PGW_1$ and $PGW_2$ are allocated to the PCRF Segment 200. $PGW_1$ has a primary connection to PCRF Cluster 1, and a secondary connection to PCRF Cluster 2, while $PGW_2$ has a primary connection to PCRF Cluster 2 and a secondary connection to PCRF Cluster 1.

As shown in FIG. 2, each PCRF Cluster may include multiple MRAs, each having multiple MPEs associated therewith. In the exemplary configuration shown in FIG. 2, the PCRF Clusters have three MRAs included therein: one active MRA, one standby MRA provided for local redundancy, and one spare MRA provided for geo-redundancy. Similarly, there are also provided active MPEs and corresponding standby MPEs and spare MPEs. For example, in the PCRF Segment 200, the $MRA_{1-A}$ and the $MRA_{2-A}$ are the active MRAs for the PCRF Clusters 1 and 2, respectively. The $MRA_{1-B}$ and the $MRA_{2-B}$ are the standby MRAs for the PCRF Clusters 1 and 2, respectively. The $MRA_{1-C}$ and the $MRA_{2-C}$ are the spare MRAs for the PCRF Clusters 1 and 2, respectively. The spare MRA for one PCRF Cluster is physically located in the site of the other PCRF Cluster in the PCRF Segment; thus, in the PCRF Segment 200, the $MRA_{1-C}$ for the PCRF Cluster 1 is located in the PCRF Cluster 2, and the $MRA_{2-C}$ for the PCRF Cluster 2 is located in the PCRF Cluster 1.

The active MRA handles messaging and MPE selection under normal operating conditions, and the active MPEs handle session establishment and management under normal operating conditions. The standby MRAs/MPEs provide local redundancy for the PCRF Cluster in which is located—when the active MRA/MPE is unavailable, the corresponding standby MRA/MPE takes over operations. The spare MRAs/MPEs located in each PCRF Cluster provide redundancy for the other PCRF Cluster of the PCRF Segment—when neither the active nor standby MRA/MPEs of one PCRF Cluster are available, then the spare MRA/MPEs located in the other PCRF Cluster take over operations. Thus, because the PCRF Clusters are provided at geographically different locations, the spare MRAs/MPEs provide geo-redundancy for the PCRF Segment 200.

In various other illustrations of the present disclosure, a PCRF segment in a geo-redundant configuration may omit the spare MRA in each PCRF Cluster (although the spare MPEs are retained) without destroying the geo-redundancy of the PCRF Segment 200. This alternative example of a PCRF segment in a geo-redundant configuration will be discussed further below.

As noted above, the PCRF 145 determines policy rules for data flows on the network, such as, for example, Quality of Service (QoS) and billing parameters for the flows. The PCRF 145 does so through establishing sessions on the MPEs.

Sessions are generally established on a per-PDN-connection basis. When a UE 120 attempts to establish a connection to a PDN 160, the PCRF 145 first establishes a session for the connection. A UE 120 may have multiple sessions in the PCRF 145 at once if it is connected to multiple PDNs 160 at once, but the UE 120 generally has at most one session for each PDN 160 to which the UE 120 is connected. Each session may govern more than one different data flows, however, since it is possible for there to be multiple data flows between a single PDN 160 and a UE 120.

For example, suppose that the wireless network 100 has only the four PDNs 160 shown in FIG. 1, namely: an IMS 161 PDN, an Internet 162 PDN, an Applications 163 PDN, and a CF 164 PDN. In such a case, the UE 120 could generally have at most four sessions in the PCRF 145 at one time (one for each PDN 160). To continue the example, if a UE 120 is making a VoLTE call via the IMS 161, then there will be a session in the PCRF 145 for the connection to the IMS 161. Suppose further that the same UE 120 attempts to send an SMS message while still making the VoLTE call (both flows via the IMS 161); although a second data flow is established, a new session in the PCRF 145 is not established, since the flows go to the same PDN 160. However, if the UE 120 attempts to browse to a web-page (requiring opening a connection to either the Internet 162 PDN or the CF 164 PDN) while the connection to the IMS 161 is still active, the PCRF 145 will establish a second session for the UE 120 in one of the MPEs. Generally, sessions end when the corresponding connection to the PDN 160 ends, and thus sessions are repeatedly being created and ending as a UE 120 initiates and ends various connections to various PDNs 160.

In certain illustrations, whenever a UE 120 is attached to the wireless network 100 and active, a default connection to the IMS 161 is maintained (regardless of whether any data flow has been previously initiated or is currently being used by the UE 120). Thus, in such illustrations, when a UE 120 attaches to the network 100, an IMS session is established for the UE 120, and this IMS session is maintained even if the UE 120 is not currently using any data flows via the IMS 161. This may be done, for example, so that the attached UE 120 may receive incoming VoLTE calls, SMS messages, and the like via the IMS 161. In such illustrations, each active UE 120 attached to the network will have at least one session in the PCRF 145 as long as it is attached to the network and active.

In order to establish a session, the PGW sends a Credit Control Request Initial (CCR-I) to the PCRF 145 via the Gx interface. The MRA receives the CCR-I message, and selects an MPE upon which the requested session will be established (selection of the MPE upon which the session will be established is discussed further below). The MRA forwards the CCR-I to the selected MPE, whereupon the selected MPE begins to establish the requested session. Each MPE has a Diameter Sh connection established to a Subscriber Profile Repository (SPR), which stores subscriber data. The SPR may be the same as the HSS 150 or located in the HSS 150. When a session is established in an MPE, the MPE retrieves subscriber data from the SPR and loads policies and traffic profiles associated with the UE 120 for which the session is being established based on the subscriber data. The MPE will use the policy information, subscriber information, and the identity of the PDN 160 (conveyed to the MPE as an Access Point Name (APN)) to establish rules for the session, including bandwidth allocations, rating groups, QoS parameters, billing parameters, etc. Different UEs 120 may have different rules established based on their different subscriber information—for example, some services may be available to some subscribers but not others, some subscribers may be allocated higher bandwidth than others for certain services, etc. UE 120 session data is stateful and maintained in a database in the MPE Moreover, the MPE may dynamically manage the sessions after their creation, changing the rules as necessary based on policy determinations and responding to inquiries from various sources such as the PGW 140, IMS 161, and CF 164.

Once the session is established, the MPE upon which the session is established sends a Credit Control Answer Initial (CCA-I) to the MRA, which forwards the CCA-I to the PGW. The CCA-I includes rules established by the MPE, as well as other information such as the identity of the MPE upon which the session has been established. The PGW 140 is responsible for enforcing the rules established by the MPE. For example, when a UE 120 requests a data flow to the PDN 160 for which a session has been created, the PGW 140 consults the rules established for the session in determining if the flow should be established and, if so, the flow's parameters. Moreover, the PGW 140 continues to examine the flow in progress to ensure that it complies with the established rules—for example, examining each data packet, determining which session it belongs to, and applying the appropriate rules for that session to the data packet.

The MRA's selection of the MPE to handle a requested session will now be discussed. A comparative example of MPE selection will be discussed first with reference to FIG. 3 to facilitate understanding of the MPE selection using the IMSI hash, which will be discussed later with reference to FIG. 4. In the comparative example, the MRA may select the MPEs on a Round-Robin basis (one-at-a-time in a predetermined repeating order). Thus, according to this system, when a CCR-I is received by the MRA, and no other session for the UE 120 is currently active in one of the MPEs, the MRA will select the next MPE in the predetermined order. However, if another session for the UE 120 already exists when a new CCR-I is received for the UE 120, the MRA may attempt to have both sessions for the same UE 120 assigned to the same MPE, which provides various efficiencies in MPE operation.

Figure 3:
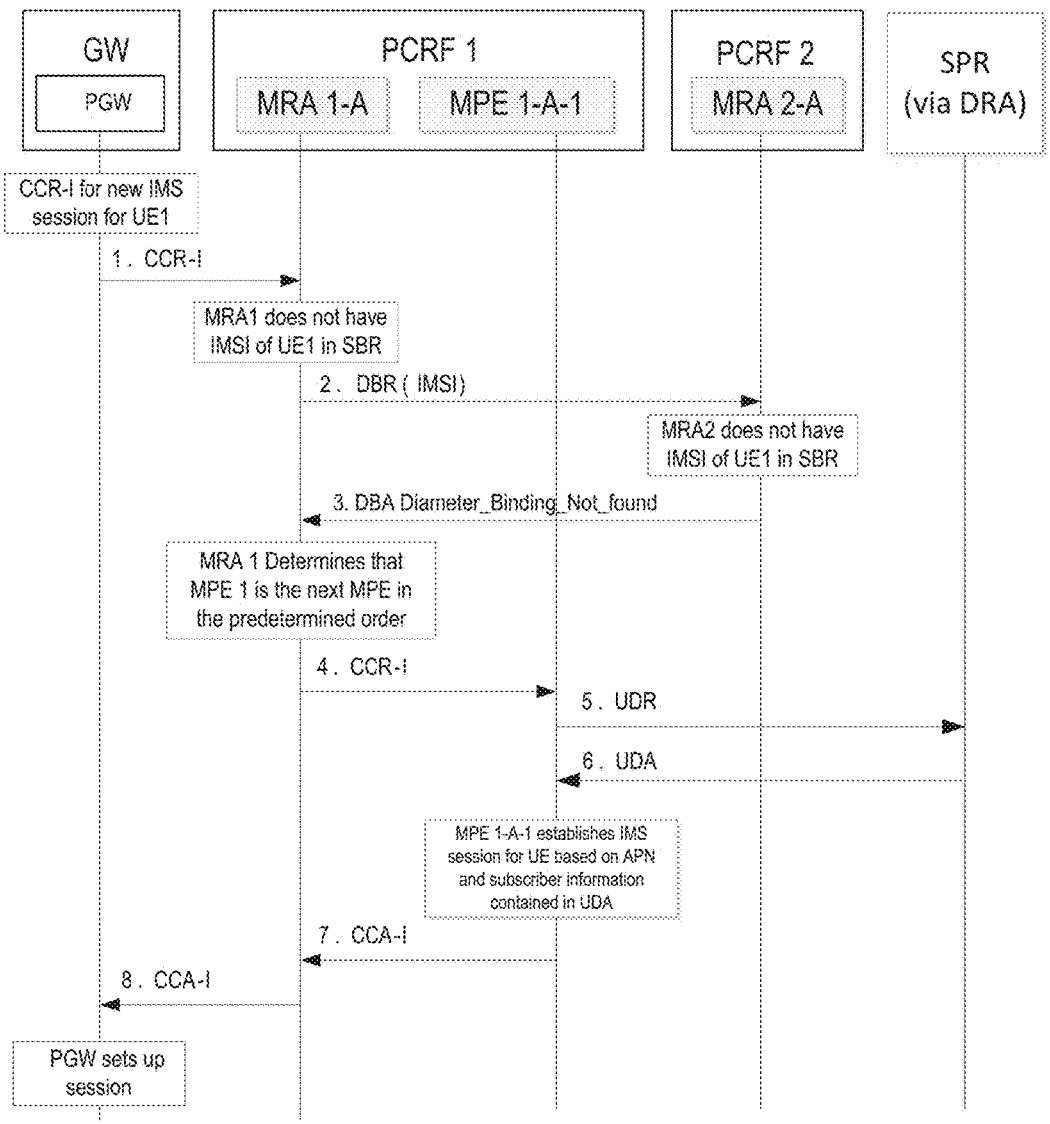
FIG. 3 illustrates a session establishment process of a related art system.

Thus, a setup of a session in the comparative example may proceed as shown in FIG. 3. In FIG. 3, the PGW requests establishment of a session for the IMS 161 for the UE1. The PGW sends a CCR-I to the $MRA_{1-A}$ of PCRF 1 (message 1). The $MRA_{1-A}$ first checks to see whether a session for the UE1 is already established on one of the MPEs associated with the MRA. For example, the $MRA_{1-A}$ may check its SBR for an entry having the IMSI of the UE1. If the $MRA_{1-A}$ cannot find the IMSI of the UE1, the $MRA_{1-A}$ must check to see if a session is established on the PCRF 2, which it does by sending a Diameter Binding Request (DBR) with the IMSI of the UE1 to the PCRF2 (message 2). The $MRA_{2-A}$ then checks to see whether a session for the UE1 is already established on one of the MPEs associated with the MRA. For example, the $MRA_{2-A}$ may check its SBR for an entry having the IMSI of the UE1. If the $MRA_{2-A}$ cannot find the IMSI of the UE1, it sends a Diameter Binding Answer (DBA) Diameter_Binding_Not_Found to the PCRF 1 (message 3). The $MRA_{1-A}$ then knows that no session for the UE1 has been established in the PCRF 1 or 2, and the $MRA_{1-A}$ can select the next MPE in the predetermined order, which in this example is $MPE_{1-A-1}$. The $MRA_{1-A}$ forwards the CCR-I to the selected MPE (message 4), which sends a User Data Request (UDR) to the SPR via a Diameter Routing Agent (DRA) (message 5). The SPR returns the requested user data to the $MPE_{1-A-1}$ in a User Data Answer (UDA) (message 6). The $MPE_{1-A-1}$ then establishes the session and sends the CCA-I to the $MRA_{1-A}$ (message 7), which forwards the CCA-I to the PGW (message 8).

In contrast to the aforementioned comparative example, in various illustrations of the present disclosure, the MRA may select the MPEs via an IMSI Hash. As noted above, the IMSI Hash may be a heuristic that maps IMSI values to the MPEs of the PCRF 145, such that when a given UE 120 requests establishment of a new session, the IMSI of the given UE 120 determines the MPE upon which the new session will be established. For example, one possible IMSI Hash could assign sessions to MPEs based on the last digit of the IMSI—if the last digit is one, the session is assigned to the first MPE, if the last digit is 7, the session is assigned to the seventh MPE and so on. Another possible IMSI Hash could associate a range of values with each active MPE, and assign a session to a given MPE when the IMSI of the UE 120 falls within the range assigned to the given MPE. It is also possible to employ more complicated IMSI Hashes, for example by using hash functions used in cryptographic applications. It may be beneficial for the hash to be tailored to produce as close to a uniform distribution of sessions across the active MPEs as possible. For example, the closer to truly random that the assignment of IMSI numbers to the various MPEs is in the IMSI Hash, the more likely it is that, in the large-number limit (i.e., when there are numerous active sessions), sessions will be uniformly distributed by the IMSI Hash. Various hash functions used in cryptographic applications may beneficially produce such close-to-uniform distributions of sessions in the large-number limit. Moreover, the loads of the MPEs may be monitored, and any imbalances above a certain threshold that occur may trigger corrective actions. For example, if there is an imbalance in the load assigned to the MPEs, the MRA could modify the IMSI hashing algorithm to reduce the number of new IMSI assignments made to overloaded MPEs. For example, if the IMSI Hash operates by assigning a range of values to each active MPE, the ranges of overloaded MPEs could be narrowed and the ranges of under-loaded MPEs could be widened until balance is reestablished. However, such corrective actions to enforce load balance may occasionally result in different sessions for the same UE 120 being handled by different MPEs. Thus it may be beneficial to minimize the use of such corrective actions in certain circumstances. For example, the corrective actions may be disabled when the average load across MPEs is below a certain threshold, since even a well-designed IMSI Hash may produce imbalance in the small-number limit (i.e., when there are few active sessions) but such an imbalance in the small-number limit may not produce deleterious effects sufficient to justify the corrective actions. The aforementioned examples of specific IMSI Hashes are merely provided for illustrative purposes, and are not intended to be limiting.

If the IMSI Hash is deterministic, all sessions from a same UE 120 will be typically routed to the same MPE, since the IMSI of the UE 120 remains constant and the MPE selection is determined by the IMSI. An example of a circumstance in which two sessions from the same UE 120 might be routed to different MPEs might be, for example, if the IMSI Hash changes between the establishment of the two sessions. Because sessions from a same UE 120 are generally routed to the same UE 120 by the IMIS Hash, the benefits of having sessions from the same UE 120 be handled by the same MPE can be largely enjoyed even if the MRA does not perform the processing step of checking an SBR to see if a session for the UE 120 is already established before selecting an MPE. Thus, in certain illustrations the MRA selects the MPE based on the IMSI Hash without first checking to see if a session for the UE 120 has already been established. This provides various advantages, including reducing the processing load for the MRA. Moreover, if the MRA selects the MPE without first checking to see if a session is already established, then the MRA of one PCRF Cluster in a geo-redundant PCRF Segment does not need to check the SBR of the MRA of the paired PCRF Cluster to see if a session for the UE 120 is already established. Such inter-MRA SBR queries require messages between the MRAs and processing by the MRAs, and thus omitting the inter-MRA SBR queries frees up bandwidth and even further reduces MRA processing loads.

Figure 4:
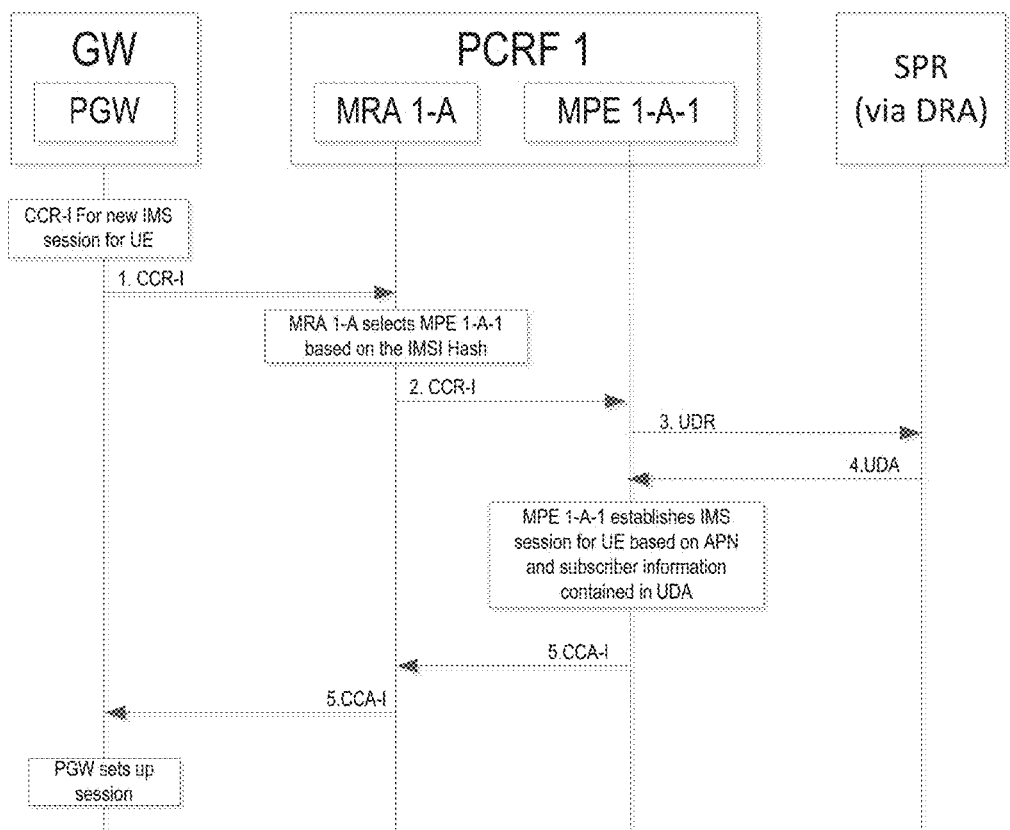
FIG. 4 illustrates an exemplary session establishment process.

For example, FIG. 4 shows a process of setting up a session when the IMSI hash is used. The PGW 140 requests establishment of an IMS session for the UE1. The PGW sends a CCR-I to the $MRA_{1-A}$ of PCRF 1 (message 1). Unlike in the process according to the comparative example as shown in FIG. 3, the $MRA_{1-A}$ does not need to check its own SBR or the SBR of any other MRA, and thus the $MRA_{1-A}$ selects the MPE based on the IMSI of the UE 120 by applying the IMSI Hash. In this example, the $MPE_{1-A-1}$ is selected, and the $MRA_{1-A}$ forwards the CCR-I to the selected $MPE_{1-A-1}$ (message 2), which sends a UDR to the SPR via the DRA (message 3). The SPR returns the requested user data to the $MPE_{1-A-1}$ in a UDA (message 4). The $MPE_{1-A-1}$ then establishes the session and sends the CCA-I to the $MRA_{1-A}$ (message 5), which forwards the CCA-I to the PGW (message 5). A comparison of FIGS. 4 and 3 clearly shows the reduction in MRA processing steps and MRA interlink messages when the IMSI Hash is used to select MPEs for session establishment rather than the comparative Round-Robin example.

After establishment of the session, the PCRF 145 continues to receive and send various messages related to the established session. For example, the PGW 140 may send further Credit Control Requests to the PCRF 145, including CCR-U (Update) and CCR-T (Terminate) messages. The MRA routes these CCR messages to the MPE handling the session, and routes the answers from the MPE (CCA-U and CCA-T) to the PGW 140. The PGW 140 generally knows the identity of the MPE handling each session after receiving the CCA-I for the respective session as the CCA-I includes information identifying the MPE handling the session. Thus, the CCR-U and CCR-T messages from the PGW 140 generally include information identifying the MPE handling the session, and the MRA is accordingly able to route these CCR messages to the appropriate MPE automatically based on the identifying information without having to perform a processing step of determining which MPE is handling the session.

In addition to the CCR messages from the PGW 140, various other components of the Network 100 may inquire with the PCRF 145 about a session. For example, the IMS 161 may communicate with the MRA over the Rx interface, and the CF 164 may communicate with the PCRF 145 via the Gx-Lite interface. In contrast to the CCR messages of the PGW 140, some of these messages from the IMS 161 or CF 164 may not include the information identifying the MPE handling the relevant session, and thus the MRA must perform a processing operation to determine which MPE to route these messages to. The MRA does so by consulting the IP indexed table.

Figure 5:
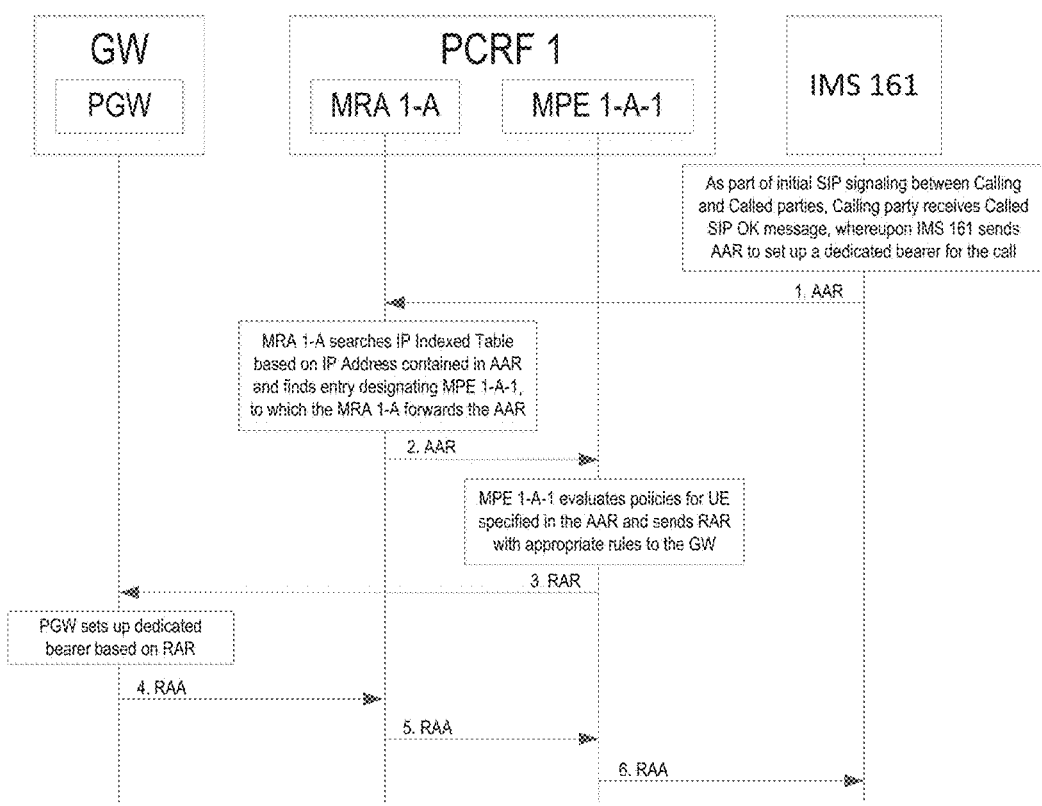
FIG. 5 illustrates an exemplary process of establishing a VoLTE dedicated bearer.

For example, if there is an attempt to initiate a VoLTE call involving a UE 120 attached to the network 100 (whether the UE 120 is the calling party or the called party), the IMS 161 communicates with the PCRF 145 as part of the process of setting up a dedicated bearer for the call. An example of the setup of a dedicated bearer for a VoLTE call is shown in FIG. 5. When a VoLTE call is initiated, initial SIP signaling between the Called and the Calling parties takes place, and once the IMS 161 receives a Called SIP OK message the IMS 161 sends an Authorization Access Request (AAR) to the PCRF 145 requesting establishment of the dedicated bearer (message 1 in FIG. 5). The AAR is sent from the IMS 161 over the Rx interface and includes the IP address used by the UE 120. Upon receipt of the AAR, the MRA of the PCRF 145 looks the IP Address specified by the AAR up in the IP Indexed Table, and routes the AAR to the MPE that is handling the default IMS session for the UE 120 based on the entry in the IP Indexed table (message 2 in FIG. 5) (recall that a default IMS session may be established for each UE 120 upon attachment thereof to the network 100). The MPE evaluates the policies for the UE specified in the AAR and generates a Reauthorization Request (RAR) that includes the relevant rules for the establishment of the dedicated bearer, such as QoS and Bandwidth rules (message 3 in FIG. 5). The PGW receives the RAR and sets up a dedicated bearer for the call, and generates a Reauthorization Answer (RAA), which is forwarded to the IMS 161 via the MRA and MPE of the PCRF (messages 4-6 of FIG. 5). Thus, in response to receiving the AAR from the IMS, the MRA can find the MPE handling the default IMS session for the UE 120 by means of the IP Indexed table even though the AAR does not specify the IMSI of the UE 120.

As another example, the CF 164 communicates with the PCRF 145 in order to determine the access settings that determine which content can be accessed via the CF 164. For example, when a given UE 120 attempts to open a webpage via the CF 164, the PGW 140 sends a CCR-I to the PCRF 145 to set up a CF session, in the manner described above. Once the CF session has been established, the PGW 140 sends an HTTP request to the CF 164. For example, the access settings may include a predetermined set of filtering levels that can be set by a user, and the CF 164 may include a Deep Packet Inspection (DPI) System that may inspect the URL and allow or deny access to the webpage based on the filtering levels. However, the DPI System is not initially aware of the filtering levels set for the UE 120, and thus inquires with the PCRF 145 in order to obtain the filtering levels. Specifically, the CF 164 may send a modified CCR-I message (hereinafter CCR-I*) to the MRA of the PCRF 145 via the Gx-Lite interface. The CCR-I* message includes the IP Address of the UE 120, and thus the MRA is able to locate the MPE that is handling the CF session for the UE 120 by means of the IP Indexed Table. The MRA forwards the CCR-I* message to the MPE handling the CF session, and the MPE replies to the CF 164 with the filtering levels that have been set for the UE 120. The CF 164 may then proceed to allow or deny access to the HTTP request (as well as subsequent HTTP requests) based on the filtering levels.

The IP Indexed Table is, as its name suggests, indexed by IP Address—specifically, the IP address(es) assigned to the UE 120. The entries of the table designate the MPE that is handling sessions for the UE 120, and the entries are made in association with the index corresponding to the IP Address of the UE 120. For example, when the MRA forwards the CCR-I to an MPE that was selected based on the IMSI Hash, the MRA may store in the IP Indexed Table an entry in association with an IP address of the UE 120, the entry consisting of a pointer pointing to the selected MPE. Thus, when the MRA receives a message that includes the IP address of the UE, but not an identification of the MPE handling the session, (such as an AAR or CCR-I*), the MRA may search the IP Indexed Table based on the IP address included in the message, and if there is an entry stored in association with the IP address index, route the message to the MPE to which the entry points.

In a PCRF Segment in a geo-redundant configuration, the MRAs of the PCRF Clusters may sync their IP Indexed Tables. This ensures that, if one site goes down, the second site is aware of the MPE assignments made by the PCRF that is now-inoperable and is able to take over the operations of the now-inoperable PCRF. In certain illustrations, the syncing is performed such that each MRA of the PCRF Segment has identical IP Indexed Tables. For example, when an active MRA establishes a new session, the MRA may push the IP address of the UE 120 and the MPE handling the session to each of the other MRAs in the PCRF Segment. In certain illustrations, this pushing of information is done substantially in real time, meaning the MRA pushes the information to the other MRAs directly after recording the information in its own IP Indexed Table (allowing, of course, for the inevitable delays resulting from finite processing and transmission speeds).

FIG. 7 illustrates an exemplary process of selecting an MPE and syncing the IP indexed tables of the MRAs. In step 701, the active $MRA_{1-A}$ of a first PCRF Cluster of a PCRF Segment receives a CCR-I message from a PGW, the CCR-I including the IMSI and IP Address of a UE 120. In step 702, the active $MRA_{1-A}$ applies the Hash heuristic to the IMSI contained in the CCR-I, the result of the Hash designating one of the MPEs of the first PCRF Cluster (for example, $MPE_{1-A-6}$). In step 703, the active $MRA_{1-A}$ forwards the CCR-I message to the $MPE_{1-A-6}$ selected by the Hash. In step 704, the IP Indexed Table of the active $MRA_{1-A}$ is updated to reflect the new session—specifically, a pointer to the selected $MPE_{1-A-6}$ is stored in the field of the IP Indexed Table that corresponds to the IP Address contained in the CCR-I. In step 705, the active $MRA_{1-A}$ pushes the table entry (i.e., the identity of the selected $MPE_{1-A-6}$ and the IP Address) to the standby $MRA_{1-B}$ of the first PCRF Cluster (local redundancy) and to the active $MRA_{2-A}$ and the standby $MRA_{2-B}$ of the second PCRF Cluster (geo-redundancy).

In situations where communication between the different sites of a geo-redundant PCRF Segment is interrupted, the immediate syncing of IP Indexed Tables may be impossible. In such a situation, the MRAs of both PCRF Clusters may continue to assign sessions to MPEs and make the appropriate entries in their own IP Indexed Tables in the usual manner, and those entries to the various IP Indexed Tables that were made during the communication outage may be pushed to the other MRAs upon resumption of communication. This post-communications-outage syncing may be facilitated in a number of ways. For example, the MRAs may be allowed to continue to attempt to push the information in the usual manner during a communication outage, and the undelivered information may be collected and retained (e.g., in a cache) for later delivery. As another example, time-stamps may be included with the entries in the IP Indexed Table, and the MRA may be configured to, upon resumption of communication, push all entries in the table having time-stamps occurring after the breakdown in communication. As another example, entries made while communication between sites is impossible may be flagged, and upon resumption of communication, flagged entries may be pushed to the other MRAs.

In certain illustrations, as noted above, the IP Indexed Tables may be synced in such a manner that the entire Table need not be transferred between MRAs. Instead, in normal operations only one entry is transferred at a time. Moreover, even when recovering from a communications failure between the sites, in one embodiment only those entries made during the communications blackout need be transferred between the MRAs. Thus, the amount of bandwidth and MRA processing required for syncing the tables is reduced.

Unlike most data stores frequently used, the IP Indexed Tables might not be repeatedly cleaned up. In particular, there deletion of entries from the IP Indexed Tables of the MRAs when the corresponding session terminates may be avoided. Instead, old entries can be overwritten by new entries when new sessions are created.

For example, suppose the MRA establishes a first session for a first UE having a given IP address assigned to it, and makes an entry in the table in association with the given IP address. Subsequently the first session terminates. The MRA may refrain from updating the table upon the termination of the session, and may leave the entry associated with the given IP address intact. This reduces the processing load on the MRA. Then, when a request to establish a second session for a second UE, which happens to also have been assigned the given IP address (IP addresses are reused by the network), the MRA may establish the second session based on the IMSI hash in the manner discussed above without having to first consult the table. Upon establishment of the second session the table entry for the given IP address is overwritten.

In other systems of MPE selection, before establishing a session the MRA checks its SBR to see if another session is already established for the UE. Thus, the SBR is updated upon termination of each session so that the MRA does not obtain incorrect information when it checks the SBR. However, when the IMSI hash and IP Indexed tables discussed above are implemented, there is no such difficulty. This is because the MRA may not consult the IP Indexed table before establishing a new session, instead establishing the session based solely on the IMSI hash.

Moreover, keeping an entry for an expired session in the IP Indexed Table does not disrupt handling of inquiries from the IMS 161 or the CF 164. When such an inquiry is received, the MRA searches the table based on the IP address included in the inquiry in the normal fashion, and forwards the inquiry to the MPE designated by the outdated entry in the table. The MPE, upon receipt of the inquiry, may inform the IMS 161 or CF 164 that the session is expired.

Thus, operations for updating the table (such as deleting entries upon session termination) may be omitted, and MRA processing loads may be reduced.

As noted above, in another system the MRAs maintain SBRs, and may consult the SBR in order to route certain messages. The IP Indexed Table differs from the SBR in a number of ways. For example, the IP Indexed Table is indexed by IP Address, while the SBR is not indexed by IP Address. Moreover, the SBR includes many types of entries that are not included in the IP Indexed Table—for example, in certain illustrations of the disclosure, the IP Indexed Table includes no other entries besides the pointer to the MPE, whereas the SBR includes session ID numbers and IMSI numbers. As another example, the IP Indexed Table of each MRA in a geo-redundant PCRF Segment will contain entries regarding sessions created by each active MRA of the PCRF Segment, whereas the SBR of each MRA includes entries for only those sessions created by itself (or by the active MRA for which it is a redundant backup if the MRA is a standby or spare MRA). Since the IP Indexed Table contains much fewer types of entries than an SBR it requires less processing power to search and less bandwidth to sync.

An additional advantage of implementing the IP Indexed tables is that a geo-redundant configuration of PCRFs 145 may be realized using fewer MRAs than would be required otherwise. An explanation of how this advantage is achieved follows.

In systems in which the MRAs do not implement the IP Indexed Tables, a spare MRA is generally required in order to provide geo-redundancy, as discussed above. However, when the IP Indexed Tables are used, the spare MRAs from the PCRF Clusters may be removed while still maintaining geo-redundancy in the PCRF Segment. This provides an advantage in that the MPE capacity of the PCRF clusters may be increased without increasing the size of the computing components (e.g., server blades) making up the cluster.

The spare MRA may be removed from each PCRF Cluster without destroying geo-redundancy because, when the IP Indexed Tables are implemented, the standby MRAs of each PCRF Cluster have all the information needed to continue routing of the messages in the event that one of the PCRF Clusters becomes inoperable. The standby MRAs have the needed information when the IP Indexed Tables are used because the respective IP Indexed Tables of all of the MRAs in the geo-redundant PCRF Segment are synced, and each IP Indexed Table in the Segment contains entries for sessions created by each MRA in the Segment. For example, consider the PCRF Cluster of FIG. 6B, in which syncing of the IP Indexed Table is implemented. The standby $MRA_{2-B}$ of site 2 has an IP Indexed Table that includes all of the table entries created by the active $MRA_{1-A}$ of site 1. Thus, if site 1 goes down, the standby $MRA_{2-B}$ can continue the operations of $MRA_{1-A}$ without delay based on the standby $MRA_{2-B}$'s own IP Indexed Table. In contrast, when the IP Indexed Tables are not implemented, the standby MRA of one site might not have the information required to continue the operations of the active MRA of the other site in the event the other site goes down. This is the case because, when the IP Indexed Tables are not implemented, the SBR of the standby MRA of each site generally includes only information about sessions initiated by the active MRA of that site. For example, the standby $MRA_{2-B}$ of site 2 in FIG. 6A (in which the IP Indexed Tables are not implemented) does not have the SBR data of the active $MRA_{1-A}$ of the other site. Thus, in order to ensure geo-redundancy in systems that do not implement the IP Indexed Tables, each site generally includes a spare MRA that has the information from the SBR of the active MRA of the other site. Thus, for example, in FIG. 6A, the spare $MRA_{1-C}$ and $MRA_{2-C}$ are included for geo-redundancy. These spare MRA's are omitted in FIG. 6B, in which IP Indexed Tables are implemented.

The increase in MPE capacity resulting from omitting the spare MRAs may be seen by comparing FIGS. 6A and 6B. In FIG. 6A, a PCRF Segment in geo-redundant configuration is shown in which the IP Indexed Table is not used, and in FIG. 6B a PCRF Segment in geo-redundant configuration is shown in which the IP Indexed Table is used (each site in the figure corresponds to a PCRF Cluster at a different geographical location). The physical computing components making up the PCRF clusters have a finite amount of space. For example, the MRAs and MPEs may be configured on server blades with a limited number of slots available. In FIG. 6A, each MRA and each MRE takes up one slot, and there are 32 slots available, thus each MPE grouping can have at most nine MPEs (if each grouping is to have the same number of MPEs, which is advantageous for redundancy). However, in FIG. 6B, the spare MRAs ($MRA_{2-C}$ and $MRA_{1-C}$) are omitted, since the IP Indexed Table is used. This frees up an additional slot, allowing each group of MPEs to have an additional MPE. Thus, using the IP Indexed Table allows for additional MPE capacity in the same physical space constraints.

In the systems and methods described above, the IMSI is used for MPE selection. However, it will be understood that the IMSI is merely one form of unique identifier of user equipment that is commonly used in telecommunications networks, but other forms of user-equipment identifiers may be used instead of the IMSI as long as they are a unique identifier of at least a component of a UE. Some examples of user-equipment identifiers may include the IMSI, an International Mobile Station Equipment Identity (IMEI), a Mobile Equipment Identifier (MEID), an Electronic Serial Number (ESN), etc. Moreover, proxies of any of the aforementioned exemplary user-equipment identifiers may also be used as user-equipment identifiers. The identifier hashed by the MRA for MPE selection may advantageously be an identifier that is already used by the network for other purposes. For example, if the HSS/SPR database uses the IMSI as an identifier, it may be advantageous for the IMSI to be used by the MRA for hashing the MPEs. Moreover, it may be advantageous for the identifier to be associated with subscriber information. For example, the IMEI is generally associated with the physical user equipment only and not with subscriber information, whereas the IMSI is generally associated with subscriber information.

In general, computing systems and/or devices, such as may be included in the UEs 120 or the various components of the network 100, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain approaches, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
providing a first policy-charging-and-rule-function (PCRF) including a first routing agent and paired in a geo-redundant configuration with a second PCRF including a second routing agent;
receiving a request to establish a session for a piece of user equipment;
selecting one of a plurality of multi-media processing engines (MPEs) included in the first PCRF to handle the session based on a user-equipment-identifier of the piece of user equipment;
storing in a table an entry, associated with the piece of user equipment, designating the selected one of the plurality of MPEs;
receiving an Authorization Access Request (AAR) including a first Internet Protocol (IP) address;
searching the table based on the first IP address included in the AAR; and
if a given IP Address in the table matches the first IP address included in the AAR, and if a given entry associated with the given IP Address designates one of the plurality of MPEs, forwarding the AAR to the one of the plurality of MPEs that is designated by the given entry.

2. The method of claim 1, wherein the request includes a subscriber identity and the first IP address of the user equipment, and further comprising:
hashing the subscriber identity in the request; and
forwarding the request to the selected one of the plurality of MPEs.

3. The method of claim 1, further comprising:
storing a pointer to the selected one of the plurality of MPEs; and
pushing the selected one of the plurality of MPEs and the first IP address of the user equipment to the second routing agent in the geo-redundant configuration.

4. The method of claim 1, wherein the table is indexed by IP Address, and the entry is associated with the first IP address of the piece of user equipment.

5. The method of claim 1, further comprising
receiving, at the second routing agent, a request to establish a second session for a second piece of user equipment;
causing the second PCRF to select one of a second plurality of MPEs included in the second PCRF to handle the second session based on a user-equipment-identifier of the second piece of user equipment;
in a second table that is indexed by IP Address and maintained by the second routing agent, storing in association with a second Internet Protocol (IP) address of the second piece of user equipment an entry designating the one of the second plurality of MPEs selected for the second session; and
syncing the table and the second table.

6. The method of claim 5, wherein
syncing the table and the second table is accomplished by, when an entry is made in either one of the table and the second table, substantially in real-time pushing a corresponding entry to the other one of the table and the second table.

7. A system comprising:
a wireless access network;
a gateway configured to control communications between the wireless access network and a packet data network; and
a first policy-charging-and-rule-function (PCRF) including a first routing agent and paired in a geo-redundant configuration with a second PCRF including a second routing agent, the first PCRF communicably connected to the gateway and a plurality of multi-media processing engines (MPEs) associated with the first routing agent,
wherein the first routing agent:
receives from the gateway a request to establish a session for a piece of user equipment,
selects one of the plurality of MPEs to handle the session based on a user-equipment-identifier of the piece of user equipment,
stores in a table an entry, associated with the piece of user equipment, designating the selected one of the plurality of MPEs,
receives an Authorization Access Request (AAR) including a first Internet Protocol (IP) address,
searches the table based on the first IP address included in the AAR, and
if a given IP Address in the table matches the first IP address included in the AAR, and if a given entry associated with the given IP Address designates one of the plurality of MPEs, forwards the AAR to the one of the plurality of MPEs that is designated by the given entry.

8. The system of claim 7, wherein the request includes a subscriber identity and the first IP address of the user equipment, and wherein the first routing agent:
hashes the subscriber identity in the request; and
forwards the request to the selected one of the plurality of MPEs.

9. The system of claim 7, wherein the first routing agent:
stores a pointer to the selected one of the plurality of MPEs; and
pushes the selected one of the plurality of MPEs and the first IP address of the user equipment to the second routing agent in the geo-redundant configuration.

10. The system of claim 7, wherein the table is indexed by IP Address, and the entry is associated with the first IP address of the piece of user equipment.

11. The system of claim 7, wherein the second routing agent:
receives, at the second routing agent, a request to establish a second session for a second piece of user equipment;
causes the second PCRF to select one of a second plurality of MPEs included in the second PCRF to handle the second session based on a user-equipment-identifier of the second piece of user equipment;
in a second table that is indexed by IP Address and maintained by the second routing agent, stores in association with a second Internet Protocol (IP) address of the second piece of user equipment an entry designating the one of the second plurality of MPEs selected for the second session; and
syncs the table and the second table.

12. The system of claim 11, wherein the syncing of the table and the second table is accomplished by, when an entry is made in either one of the table and the second table, substantially in real-time pushing a corresponding entry to the other one of the table and the second table.

13. A system comprising:
a first policy-charging-and-rule-function (PCRF) including a first routing agent and paired in a geo-redundant configuration with a second PCRF including a second routing agent; and
a plurality of multi-media processing engines (MPEs), wherein the first routing agent:
receives a request to establish a session for a piece of user equipment,
selects one of the plurality of MPEs to handle the session based on a user-equipment-identifier of the piece of user equipment,
stores in a table an entry, associated with the piece of user equipment, designating the selected one of the plurality of MPEs,
receives an Authorization Access Request (AAR) including a first Internet Protocol (IP) address,
searches the table on the basis of the first IP address included in the AAR, and
if a given IP Address in the table matches the first IP address included in the AAR, and if a given entry associated with the given IP Address designates one of the plurality of MPEs, forwards the AAR to the one of the plurality of MPEs that is designated by the given entry.

14. The method of claim 13, wherein the request includes a subscriber identity and the first IP address of the user equipment, and wherein the first routing agent:
hashes the subscriber identity in the request; and
forwards the request to the selected one of the plurality of MPEs.

15. The method of claim 13, wherein the first routing agent:
stores a pointer to the selected one of the plurality of MPEs; and
pushes the selected one of the plurality of MPEs and the first IP address of the user equipment to the second routing agent in the geo-redundant configuration.

16. The method of claim 13, wherein the table is indexed by IP Address, and the entry is associated with the first IP address of the piece of user equipment.

17. The method of claim 13, wherein the second routing agent:
receives, at the second routing agent, a request to establish a second session for a second piece of user equipment;
causes the second PCRF to select one of a second plurality of MPEs included in the second PCRF to handle the second session based on a user-equipment-identifier of the second piece of user equipment;
in a second table that is indexed by IP Address and maintained by the second routing agent, stores in association with a second Internet Protocol (IP) address of the second piece of user equipment an entry designating the one of the second plurality of MPEs selected for the second session; and
syncs the table and the second table.

* * * * *